US012750706B2

(12) United States Patent
Chang et al.

(10) Patent No.: US 12,750,706 B2
(45) Date of Patent: Sep. 29, 2026

(54) MINIMIZATION OF DRIVE TEST FOR USER EQUIPMENT DEVICES

(71) Applicant: Kyocera Corporation, Kyoto (JP)

(72) Inventors: Henry Chang, San Diego, CA (US); Masato Fujishiro, Yokohama (JP)

(73) Assignee: Kyocera Corporation, Kyoto (JP)

( * ) Notice: Subject to any disclaimer, the term of this patent is extended or adjusted under 35 U.S.C. 154(b) by 1198 days.

(21) Appl. No.: 17/428,568

(22) PCT Filed: Feb. 12, 2020

(86) PCT No.: PCT/US2020/017907
§ 371 (c)(1),
(2) Date: Aug. 4, 2021

(87) PCT Pub. No.: WO2020/167931
PCT Pub. Date: Aug. 20, 2020

(65) Prior Publication Data

US 2022/0132347 A1 Apr. 28, 2022

Related U.S. Application Data

(60) Provisional application No. 62/805,782, filed on Feb. 14, 2019.

(51) Int. Cl.
*H04W 24/10* (2009.01)
*H04W 24/02* (2009.01)
(Continued)

(52) U.S. Cl.
CPC ........... *H04W 24/10* (2013.01); *H04W 24/02* (2013.01); *H04W 76/19* (2018.02); *H04W 74/0833* (2013.01)

(58) Field of Classification Search
None
See application file for complete search history.

(56) References Cited

U.S. PATENT DOCUMENTS

2014/0024366 A1* 1/2014 Bodog .................. H04W 24/02 455/432.1
2014/0128057 A1* 5/2014 Siomina ................ H04W 56/00 455/423

(Continued)

FOREIGN PATENT DOCUMENTS

KR 10-2012-0133879 A 12/2012
WO WO 2020/042040 * 8/2018 ............ H04W 76/27
WO WO 2020/034325 A1 * 9/2018 ............ H04W 24/02

OTHER PUBLICATIONS

Andreas Hoglund et al.; 3GPP Release 15 Early Data Transmission, Jun. 2018, IEEE Communications Standards Magazine (Year: 2018).*

(Continued)

*Primary Examiner* — Mansour Oveissi
*Assistant Examiner* — Ning Li

(57) ABSTRACT

Methods and devices are described that utilize the Early Data Transmission (EDT) protocol of 3GPP 5G New Radio for minimization of drive test (MDT) operations. Utilizing EDT for transmission of an MDT log availability indication, reception of an MDT log retrieval request, and/or transmission of MDT log data, reduces the power consumption and the required memory storage of user equipment (UE) devices that perform the MDT operations. In some examples, the measurement periodicity of the MDT measurements can be scaled by the mobility status of the UE device.

14 Claims, 6 Drawing Sheets

(51) Int. Cl.
*H04W 74/0833* (2024.01)
*H04W 76/19* (2018.01)

(56) References Cited

U.S. PATENT DOCUMENTS

| | | | | |
|---|---|---|---|---|
| 2015/0031308 | A1* | 1/2015 | Schmidt | H04W 24/10 455/67.11 |
| 2017/0094676 | A1 | 3/2017 | Kim et al. | |
| 2017/0134980 | A1 | 5/2017 | Persson et al. | |
| 2018/0063737 | A1* | 3/2018 | Yamine | H04W 24/10 |
| 2018/0359064 | A1* | 12/2018 | Kim | H04W 74/0833 |
| 2019/0104553 | A1* | 4/2019 | Johansson | H04W 74/0833 |
| 2019/0116461 | A1* | 4/2019 | Callender | H04W 36/0088 |
| 2019/0159197 | A1* | 5/2019 | Shrestha | H04W 72/21 |
| 2020/0067664 | A1* | 2/2020 | Kim | H04L 5/0032 |
| 2021/0029623 | A1* | 1/2021 | Awada | H04W 72/0446 |
| 2021/0195424 | A1* | 6/2021 | Wang | H04W 12/106 |
| 2021/0219163 | A1* | 7/2021 | Sha | H04W 76/30 |
| 2021/0258954 | A1* | 8/2021 | Wang | H04W 52/0216 |
| 2021/0306892 | A1* | 9/2021 | Li | H04W 24/10 |
| 2021/0360710 | A1* | 11/2021 | Höglund | H04W 52/365 |

OTHER PUBLICATIONS

3GPP; "Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 15)", TS TS37.320; Jun. 2018; Valbonne, FR.

Huawei, Hisilicon, Intel Corporation; "Correction on Bluetooth and WLAN measurement collection in MDT", R2-1818256; 3GPP TSG-RAN WG2 Meeting #104; Nov. 2, 2018; Spokane, US.

* cited by examiner

MINIMIZATION OF DRIVE TEST FOR USER EQUIPMENT DEVICES

CLAIM OF PRIORITY

The present application claims priority to Provisional Application No. 62/805,782, entitled "Minimization Of Drive Test For MTC Devices", filed Feb. 14, 2019, assigned to the assignee hereof, and hereby expressly incorporated by reference in its entirety.

FIELD

This invention generally relates to wireless communications and more particularly to transmitting minimization of drive test (MDT) log data from user equipment devices.

BACKGROUND

Wireless communication systems operating in accordance with various standards employ minimization of drive tests (MDTs) to improve wireless communication coverage. For example, when new base stations are deployed, drive tests are performed before and after service activation of the new cell (base station). Initially, downlink/uplink (DL/UL) coverage measurements of the new cell and neighbor cells are made in the intended area of coverage improvement.

During this phase, initial area tuning is performed (e.g. selection of an appropriate antenna for the new cell, adjustment of antenna tilting of the new cell and neighbor cells, etc.). Service with the new cell will be started after such initial tuning. Drive tests are performed to collect more extensive data of DL/UL coverage measurements in the intended area to confirm that adequate DL/UL coverage is being provided.

In order to reduce the rigorous drive tests that are needed to collect downlink/uplink coverage measurements, a minimization of drive test (MDT) can be used to gather data. Using an MDT procedure, measurements can be collected from user equipment (UE) devices without the need for the extensive drive tests. As a result, the MDT can reduce network maintenance costs for operators, ensure a faster optimization cycle resulting in higher customer satisfaction, and help to reduce the carbon emissions from a drive test, which protects the environment. Furthermore, MDT enables operators to collect measurements from areas which are not accessible for drive tests (e.g. narrow roads, forests, private land/house/office).

SUMMARY

Methods and devices are described that utilize the Early Data Transmission (EDT) protocol of 3GPP 5G New Radio for minimization of drive test (MDT) operations. Utilizing EDT for transmission of an MDT log availability indication, reception of an MDT log retrieval request, and/or transmission of MDT log data, reduces the power consumption and the required memory storage of user equipment (UE) devices that perform the MDT operations. In some examples, the measurement periodicity of the MDT measurements can be scaled by the mobility status of the UE device.

DETAILED DESCRIPTION

Besides reducing maintenance costs, the time required for the optimization cycle, and carbon emissions, a minimization of drive test (MDT) can also be used in conjunction with mobility, capacity, and quality of service (QoS) optimizations. In order to collect MDT measurements from a user equipment (UE) device, the UE device must be configured with the MDT configuration parameters. The MDT configuration parameters can include indicators of which signal characteristics to measure, what signal characteristics to report, the time stamp of the MDT log, how long the MDT measurements should last, and to which radio access technology (RAT) the MDT measurements will apply. Once the UE device is configured with MDT configuration parameters, the UE device is required to measure and log the specified signal characteristic information once every period depending on the configured measurement periodicity (e.g., logging interval). Even if the UE device is stationary and the received signal strength is relatively unchanged, the UE device is typically required to measure and log at every time interval.

Since $3^{rd}$ Generation Partnership Project (3GPP) Release 10, MDT has been targeted towards smartphones. However, the 3GPP specifications do not exclude Machine-type-Communication (MTC) devices. MTC devices, especially massive MTC (mMTC) devices, are expected to become a much bigger integral of 3GPP 5G New Radio (NR) deployments. Thus, MDT will also be needed for networks to configure resources and parameters crucial to mMTC device operations.

However, MTC devices are generally limited in reserve power. For example, in some cases, the batteries in some MTC devices are expected to last up to 10 years without recharging. Secondly, the memory capacity in some MTC devices may also be limited in comparison to smartphones. Therefore, a new mechanism for MDT operation is needed to reduce power consumption and to limit the required memory storage.

Currently, an EDT (Early Data Transmission) protocol is specified in 3GPP Release 15 to allow MTC devices to send small data transmissions to and receive small data transmissions from the base station (e.g., gNB in 5G NR) during the random access procedure. In particular, EDT for the uplink is triggered when small data is available at the MTC device's buffer and the uplink data size is less than or equal to a Transport Block size indicated in the system information. Subsequently, the upper layers will request the establishment or resumption of the Radio Resource Control (RRC) Connection for Mobile Originated data (e.g., not signaling or Short Message Service) to deliver the small data during the random access procedure.

As described herein, EDT is used for MDT operation in accordance with the 5G NR specification. To conserve power, one or more of the following may be handled via EDT: transmission of an MDT log availability indication, reception of an MDT log retrieval request, and transmission of MDT log data.

Figure 1:
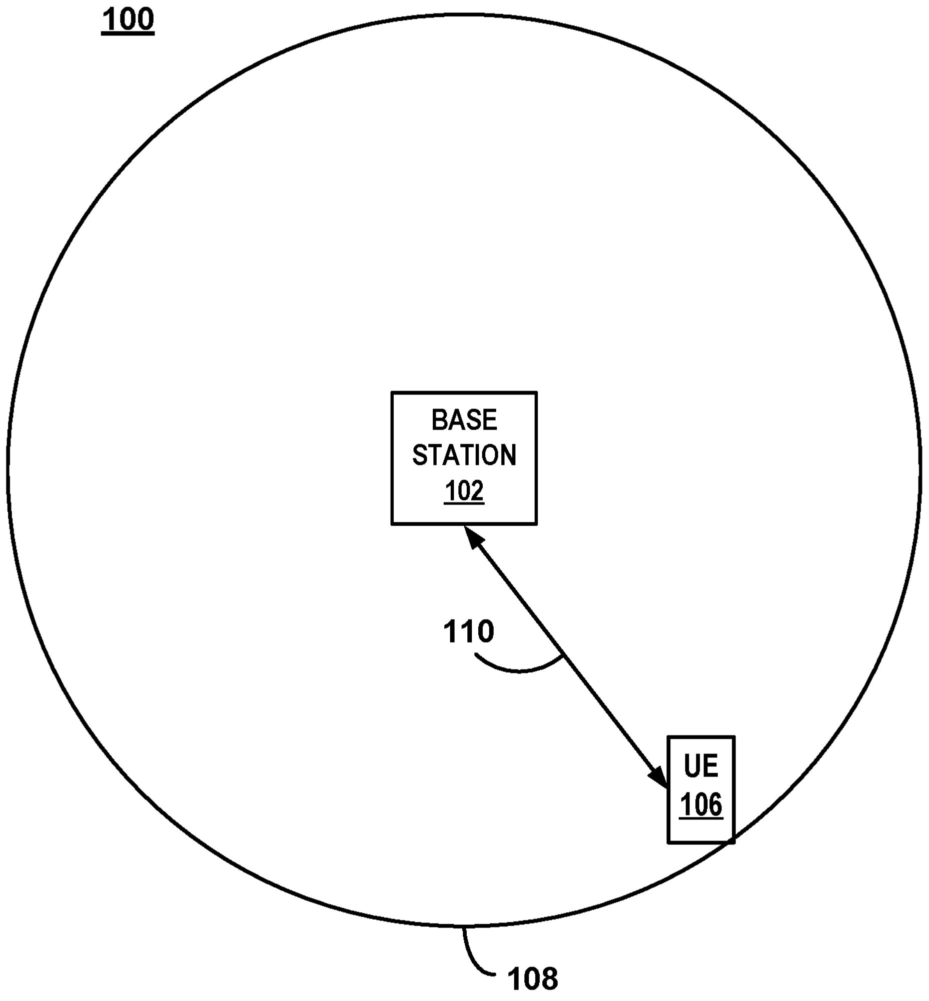
FIG. 1 is a block diagram of a communication system for an example in which a base station wirelessly communicates with a user equipment (UE) device to obtain minimization of drive test (MDT) log data.

FIG. 1 is a block diagram of a communication system for an example in which a base station wirelessly communicates with a user equipment (UE) device to obtain minimization of drive test (MDT) log data. The communication system 100 is part of a radio access network (not shown) that provides various wireless services to UE devices that are located within the respective service areas of the various base stations that are part of the radio access network. For the examples herein, communication system 100 operates in accordance with at least one revision of the 3rd Generation Partnership Project 5G New Radio (3GPP 5G NR) communication specification.

In the interest of clarity and brevity, communication system 100 is shown as having only one base station 102. However, in other examples, communication system 100 could have any suitable number of base stations. In the example of FIG. 1, at least a portion of the service area (cell) for base station 102 is represented by cell 108. Cell 108 is represented by a circle, but a typical communication system 100 would have a plurality of cells, each having variously shaped geographical service areas.

Base station 102, sometimes referred to as a gNodeB or gNB, communicates with wireless user equipment (UE) device 106 via wireless communication link 110. Base station 102 transmits downlink signals to UE device 106 and receives uplink signals from UE device 106 via wireless communication link 110. As used herein, the terms "base station" and "cell" are interchangeable.

Figure 2A:
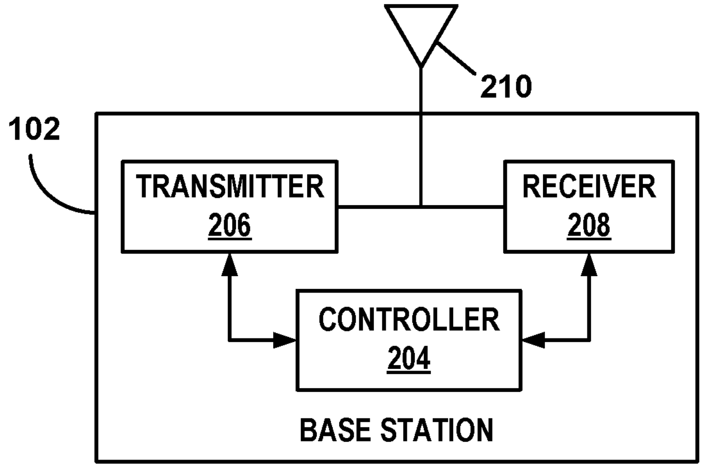
FIG. 2A is a block diagram of an example of the base station shown in FIG. 1.

Base station 102 is connected to the network through a backhaul (not shown) in accordance with known techniques. As shown in FIG. 2A, base station 102 comprises controller 204, transmitter 206, and receiver 208, as well as other electronics, hardware, and code. In other examples, base station 102 may have circuitry and/or a configuration that differs from that of the base station 102 shown in FIG. 2A.

The base station 102 is any fixed, mobile, or portable equipment that performs the functions described herein. The various functions and operations of the blocks described with reference to the base station 102 may be implemented in any number of devices, circuits, or elements. Two or more of the functional blocks may be integrated in a single device, and the functions described as performed in any single device may be implemented over several devices.

For the example shown in FIG. 2A, base station 102 may be a fixed device or apparatus that is installed at a particular location at the time of system deployment. Examples of such equipment include fixed base stations or fixed transceiver stations. In some situations, base station 102 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, base station 102 may be a portable device that is not fixed to any particular location. Accordingly, base station 102 may be a portable user device such as a UE device in some circumstances.

Controller 204 includes any combination of hardware, software, and/or firmware for executing the functions described herein as well as facilitating the overall functionality of base station 102. An example of a suitable controller 204 includes code running on a microprocessor or processor arrangement connected to memory. Transmitter 206 includes electronics configured to transmit wireless signals. In some situations, transmitter 206 may include multiple transmitters. Receiver 208 includes electronics configured to receive wireless signals. In some situations, receiver 208 may include multiple receivers. Receiver 208 and transmitter 206 receive and transmit signals, respectively, through antenna 210. Antenna 210 may include separate transmit and receive antennas. In some circumstances, antenna 210 may include multiple transmit and receive antennas.

Transmitter 206 and receiver 208 in the example of FIG. 2A perform radio frequency (RF) processing including modulation and demodulation. Receiver 208, therefore, may include components such as low noise amplifiers (LNAs) and filters. Transmitter 206 may include filters and amplifiers. Other components may include isolators, matching circuits, and other RF components. These components in combination or cooperation with other components perform the base station functions. The required components may depend on the particular functionality required by the base station.

Transmitter 206 includes a modulator (not shown), and receiver 208 includes a demodulator (not shown). The modulator modulates the downlink signals to be transmitted to UE device 106 via wireless communication link 110 and can apply any one of a plurality of modulation orders. The demodulator demodulates any uplink signals received at the base station 102 in accordance with one of a plurality of modulation orders.

Figure 2B:
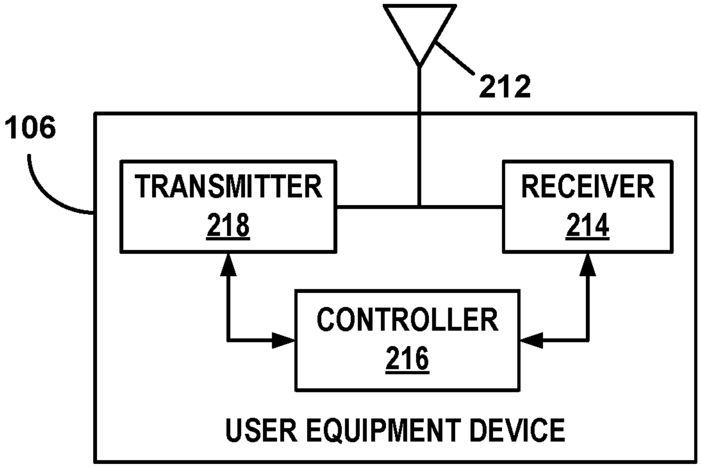
FIG. 2B is a block diagram of an example of the UE device shown in FIG. 1.

UE device 106 receives downlink signals from base station 102 via antenna 212 and receiver 214, as shown in FIG. 2B. Besides antenna 212 and receiver 214, UE device 106 further comprises controller 216 and transmitter 218, as well as other electronics, hardware, and code. In other examples, UE device 106 may have circuitry and/or a configuration that differs from that of UE device 106 shown in FIG. 2B.

In the example shown in FIG. 1, the communication link between UE device 106 and base station (gNB) 102 is a Uu link, which is configured to provide downlink communication from base station 102 to UE device 106 and to provide uplink communication from UE device 106 to base station 102.

In some examples, UE device 106 is any wireless communication device such as a mobile phone, a transceiver modem, a personal digital assistant (PDA), a tablet, or a smartphone. In other examples, UE device 106 is an MTC UE device. Thus, UE device 106 is any fixed, mobile, or portable equipment that performs the functions described herein. The various functions and operations of the blocks described with reference to UE device 106 may be implemented in any number of devices, circuits, or elements. Two or more of the functional blocks may be integrated in a single device, and the functions described as performed in any single device may be implemented over several devices.

Controller 216 includes any combination of hardware, software, and/or firmware for executing the functions described herein as well as facilitating the overall functionality of a UE device. An example of a suitable controller 216 includes code running on a microprocessor or processor arrangement connected to memory. Transmitter 218 includes electronics configured to transmit wireless signals. In some situations, transmitter 218 may include multiple transmitters. Receiver 214 includes electronics configured to receive wireless signals. In some situations, receiver 214 may include multiple receivers. Receiver 214 and transmitter 218 receive and transmit signals, respectively, through antenna 212. Antenna 212 may include separate transmit and receive antennas. In some circumstances, antenna 212 may include multiple transmit and receive antennas.

Transmitter 218 and receiver 214 in the example of FIG. 2B perform radio frequency (RF) processing including modulation and demodulation. Receiver 214, therefore, may include components such as low noise amplifiers (LNAs) and filters. Transmitter 218 may include filters and amplifiers. Other components may include isolators, matching circuits, and other RF components. These components in combination or cooperation with other components perform the UE device functions. The required components may depend on the particular functionality required by the UE device.

Transmitter 218 includes a modulator (not shown), and receiver 214 includes a demodulator (not shown). The modulator can apply any one of a plurality of modulation orders to modulate the signals to be transmitted to base station 102 as uplink signals. The demodulator demodulates the downlink signals received from base station 102, in accordance with one of a plurality of modulation orders.

In operation, the UE device 106 of FIG. 1 is configured with MDT configuration parameters to measure one or more characteristics of signals received from base station 102. In other examples, UE device 106 may also be configured to measure one or more characteristics of signals received from one or more additional neighboring base stations. The MDT configuration parameters can include one or more of the following: indicators of which signal characteristics to measure, indicators of which signal characteristics to report, a time stamp of the MDT log, an indication of how long the MDT measurements should last, a configured measurement periodicity (e.g., logging interval that determines how often UE device 106 should measure the requested signal characteristics), and an indicator indicating to which radio access technology (RAT) the MDT measurements will apply. In the example of FIG. 1, UE device 106 receives the MDT configuration parameters (e.g., MDT configuration information), including a measurement periodicity, via antenna 212 and receiver 214.

Once UE device 106 is configured with the MDT configuration parameters, UE device 106 is required to measure and log the requested signal characteristic information (e.g., MDT log data) once every period depending on the configured measurement periodicity (e.g., logging interval). Even if UE device 106 is stationary and the received signal strength of a signal received from base station 102 is relatively unchanged, UE device 106 is generally required to measure and log the requested signal characteristics at every logging interval, unless the MDT configuration parameters specify that UE device 106 should measure and log MDT data more frequently or less frequently than once per logging interval. As will be discussed more fully below, the measurement periodicity may also be scaled with the mobility status of UE device 106, which may change how often UE device 106 measures the requested signal characteristics.

Figure 3A:
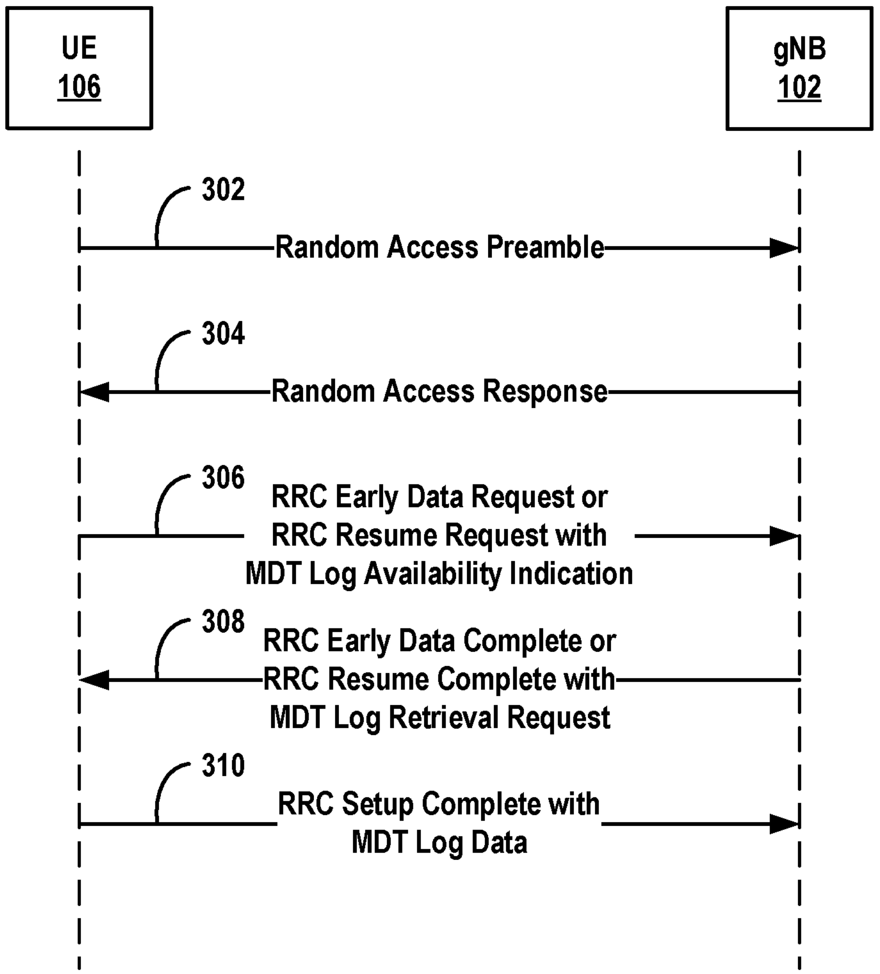
FIG. 3A is a messaging diagram of an example of the messages exchanged between the various system components shown in FIG. 1 when an MDT log availability indication is used.
Figure 3B:
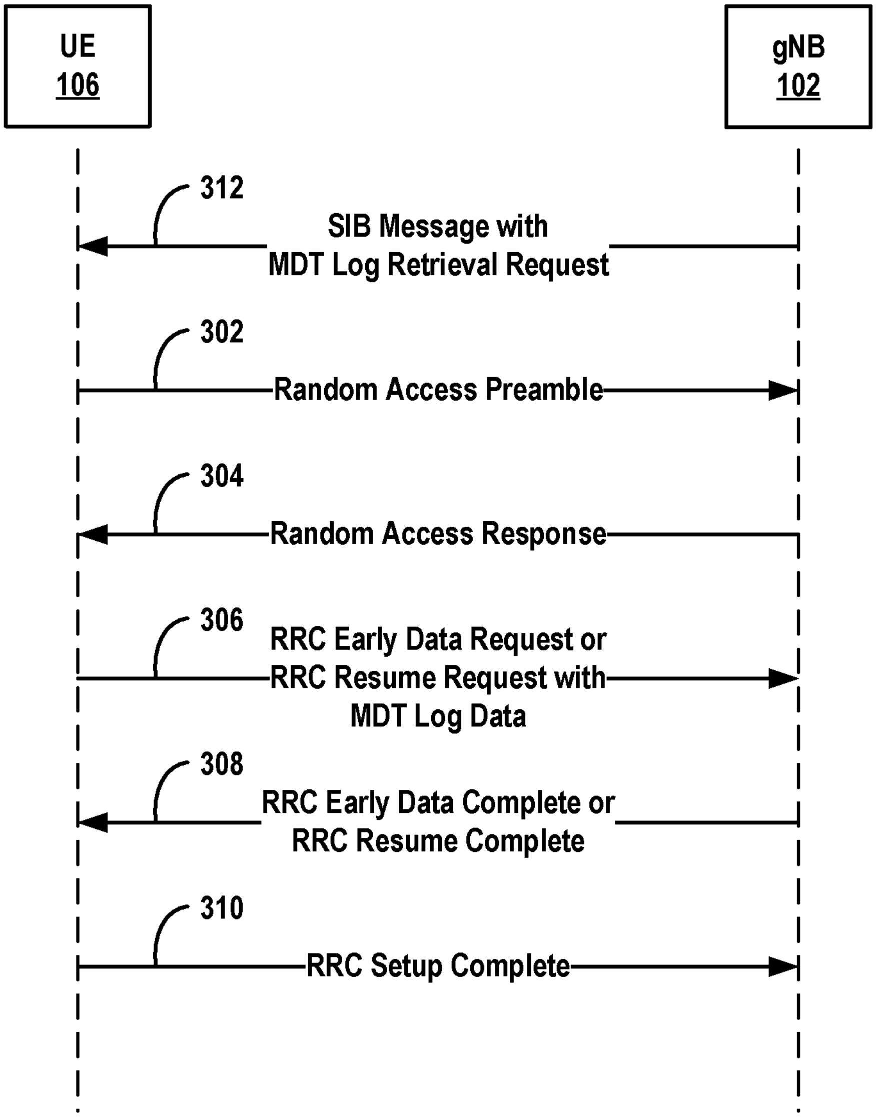
FIG. 3B is a messaging diagram of an example of the messages exchanged between the various system components shown in FIG. 1 when the MDT log availability indication is omitted.

After recording the requested MDT log data, UE device 106 sends the MDT log data to base station 102. In some examples, the MDT log data is transmitted in a message that conforms to the EDT protocol. FIG. 3A shows an example in which UE device 106 informs base station 102 that MDT log data is available before sending the MDT log data to base station 102. FIG. 3B shows an example in which UE device 106 omits sending an MDT log availability indication and transmits the MDT log data in response to an MDT log retrieval request received from base station 102.

FIG. 3A is a messaging diagram of an example of the messages exchanged between the various system components shown in FIG. 1 when an MDT log availability indication is used. In this example, UE device 106 initiates the Early Data Transmission (EDT) procedure and selects a random access preamble configured for EDT. UE device 106 transmits, via transmitter 218 and antenna 212, the selected random access preamble (e.g., Message 1) to base station 102. The transmission of the random access preamble is represented in FIG. 3A by signal 302.

UE device 106 receives, via antenna 212 and receiver 214, a random access response (e.g., Message 2) from base station 102. In the example shown in FIG. 3A, the random access response message also includes an uplink data resource allocation that indicates uplink resources that have been allocated for UE device 106 to transmit MDT log data to base station 102. The reception of the random access response is represented in FIG. 3A by signal 304.

UE device 106 transmits, via transmitter 218 and antenna 212, an MDT log availability indication (e.g., Message 3) to base station 102. In the example of FIG. 3A, the MDT log availability indication is included with a Radio Resource Control (RRC) Early Data Request message. In other examples, Message 3 can also be an RRC Resume Request message. The MDT log availability indication indicates that MDT log data is available at UE device 106. The transmission of the RRC Early Data Request with an MDT log availability indication is represented in FIG. 3A by signal 306. Regardless of whether Message 3 is included with an RRC Early Data Request message or an RRC Resume Request message, transmission of the MDT log availability indication involves transmitting the MDT log availability indication via a random access message that conforms to the EDT protocol.

In other examples, the MDT log availability indication can be implicitly transmitted with the random access preamble (Message 1). Although Message 1 contains only the random access preamble, by selecting a random access preamble configured for EDT, UE device 106 is implicitly indicating to base station 102 that MDT log data is available for retrieval.

In some examples, UE device 106 may also include the size of the available MDT log data along with the MDT log availability indication so that base station 102 can allocate sufficient uplink data resources for transmission of the MDT log data that is available at UE device 106.

UE device 106 receives, via antenna 212 and receiver 214, an MDT log retrieval request (e.g., Message 4), which is included with a Radio Resource Control (RRC) Early Data Complete message from base station 102. In other examples, Message 4 can be an RRC Resume Complete message. The MDT log retrieval request is a request from base station 102 for UE device 106 to transmit its available MDT log data to base station 102. The reception of the RRC Early Data Complete message with an MDT log retrieval request is represented in FIG. 3A by signal 308. Regardless of whether Message 4 is included with an RRC Early Data Complete message or an RRC Resume Complete message, the MDT log retrieval request is received via a random access message that conforms to the EDT protocol.

Although the example of FIG. 3A involves UE device 106 receiving an MDT log retrieval request in Message 4, UE device 106 may receive the MDT log retrieval request along with the random access response in Message 2, in other examples.

Although the example of FIG. 3A involves UE device 106 receiving an uplink data resource allocation in Message 2, UE device 106 may receive the uplink data resource allocation along with the MDT log retrieval request in Message 4, in other examples. One advantage of sending the uplink data resource allocation in Message 4 is that base station 102 can take the size of the available MDT log data, which may be transmitted with the MDT log availability indication in Message 3, into account when allocating uplink data resources to UE device 106. However, in still other examples, base station 102 may simply allocate, via Message 2 or Message 4, uplink resources to UE device 106 that are equal to the maximum allowable data size specified in the System Information.

UE device 106 transmits, via transmitter 218 and antenna 212, MDT log data (e.g., Message 5) with a Radio Resource Control (RRC) Setup Complete message to base station 102. The MDT log data is the MDT log data that is to be reported to base station 102 based on the MDT configuration parameters used to configure UE device 106 to perform MDT operations. The transmission of the RRC Setup Complete message with MDT log data is represented in FIG. 3A by signal 310. In other examples, UE device 106 transmits its MDT log data to base station 102 without waiting to receive an MDT log retrieval request.

In the example shown in FIG. 3A, UE device 106 sends the MDT log availability indication without completing a connection establishment procedure with base station 102. For example, it is assumed that UE device 106 generally operates in a manner to conserve power by operating in an IDLE mode unless UE device 106 has application data that needs to be sent to or received from base station 102. Thus, UE device 106 will complete a connection establishment procedure (e.g., transition from an IDLE mode to a CONNECTED mode) with base station 102 when UE device 106 has application data that needs to be sent to or received from base station 102. After transitioning to a CONNECTED mode with base station 102, UE device transmits its available MDT log data along with the application data that needs to be sent to base station 102. Thus, in this example, UE device 106 will not generally transition to a CONNECTED mode only to send MDT log data. However, in the event that base station 102 does not allocate sufficient uplink data resources for transmission of the MDT log data that is available at UE device 106, UE device 106 may transition to a CONNECTED mode with base station 102 in order to send the MDT log data to the network.

FIG. 3B is a messaging diagram of an example of the messages exchanged between the various system components shown in FIG. 1 when the MDT log availability indication is omitted. In the previous example shown in FIG. 3A, UE device 106 transmits an MDT log availability indication and then receives an MDT log retrieval request so that the network, via base station 102, can select which UE device's MDT log data to retrieve. Conversely, in the example shown in FIG. 3B, the MDT log availability indication is omitted, and base station 102 can indicate, via System Information Block (SIB) messaging, whether UE device 106 can autonomously report its available MDT log data for a particular MDT campaign. An MDT campaign is governed by MDT configuration parameters chosen to collect MDT measurement information that is pertinent to the installation, optimization, modification, and/or removal of one or more particular base stations within the network. Although the System Information message for autonomous MDT log data reporting is applicable to all UE devices under the same MDT campaign, the network knows the MDT configuration for all its UE devices so that the autonomous MDT reporting will not cause a strain to the network's load; otherwise, the network can refrain from sending the indication over System Information.

For the example shown in FIG. 3B, UE device 106 receives, via antenna 212 and receiver 214, a System Information Block (SIB) message that includes an MDT log retrieval request (e.g., Message 4) that conforms to the EDT protocol and specifies a particular MDT campaign. The reception of the SIB message with the MDT log retrieval request is represented in FIG. 3B by signal 312.

In this example, UE device 106 selects a random access preamble configured for EDT. UE device 106 transmits, via transmitter 218 and antenna 212, the selected random access preamble (e.g., Message 1) to base station 102. The transmission of the random access preamble is represented in FIG. 3B by signal 302.

UE device 106 receives, via antenna 212 and receiver 214, a random access response (e.g., Message 2) from base station 102. In the example shown in FIG. 3B, the random access response message also includes an uplink data resource allocation that indicates uplink resources that have been allocated for UE device 106 to transmit MDT log data to base station 102. The reception of the random access response is represented in FIG. 3B by signal 304.

UE device 106 transmits, via transmitter 218 and antenna 212, at least one MDT log data transmission (e.g., Message 3) along with a Radio Resource Control (RRC) Early Data Request message to base station 102. In other examples, Message 3 can be an RRC Resume Request message. The at least one MDT log data transmission includes MDT log data associated with the particular MDT campaign specified in the MDT log retrieval request. The transmission of the RRC Early Data Request with MDT log data is represented in FIG. 3B by signal 306.

Although FIG. 3B shows the MDT log data being reported in Message 3 (e.g., signal 306), the MDT log data can be autonomously reported by UE device 106 over one or more of Message 3 (e.g., signal 306) and Message 5 (e.g., in an RRC Setup Complete message represented by signal 310), in other examples. Thus, in at least some cases, the MDT log data transmissions conform to the EDT protocol. If the network is no longer interested in receiving MDT log reporting, the network will stop base station 102 from transmitting SIB messaging containing the MDT log retrieval request so that UE device 106 will revert back to the legacy operation for transmitting MDT log availability indications, receiving MDT log retrieval requests, and transmitting MDT log data. In the legacy operation, UE device 106 will establish or resume connection to base station 102 and when establishing/resuming operation, UE device 106 will send an MDT log data availability indication to base station 106. After connection is established, base station 102 may send an MDT log retrieval request to the UE device 106 and the UE device 106 can subsequently sent the MDT log to base station 102.

Figure 4:
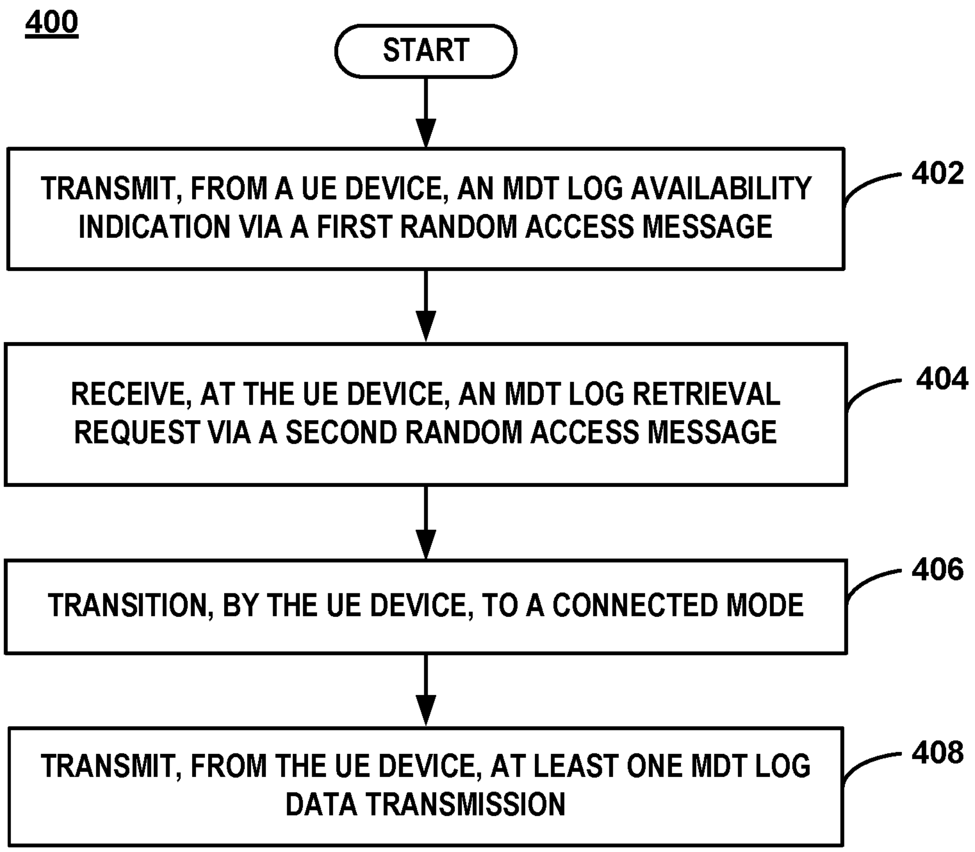
FIG. 4 is a flowchart of an example of a method in which an MDT log availability indication is used during retrieval of MDT log data from a UE device.

FIG. 4 is a flowchart of an example of a method in which an MDT log availability indication is used during retrieval of MDT log data from a UE device. The method 400 begins at step 402 with transmitting, from UE device 106, an MDT log availability indication via a first random access message (e.g., signal 306 in FIG. 3A). At step 404, UE device 106 receives an MDT log retrieval request via a second random access message (e.g., signal 308 in FIG. 3A). At step 406, UE device 106 transitions to a CONNECTED mode. At step 408, UE device 106 transmits at least one MDT log data transmission. In other examples, one or more of the steps of method 400 may be omitted, combined, performed in parallel, or performed in a different order than that described herein or shown in FIG. 4. In still further examples, additional steps may be added to method 400 that are not explicitly described in connection with the example shown in FIG. 4.

Figure 5:
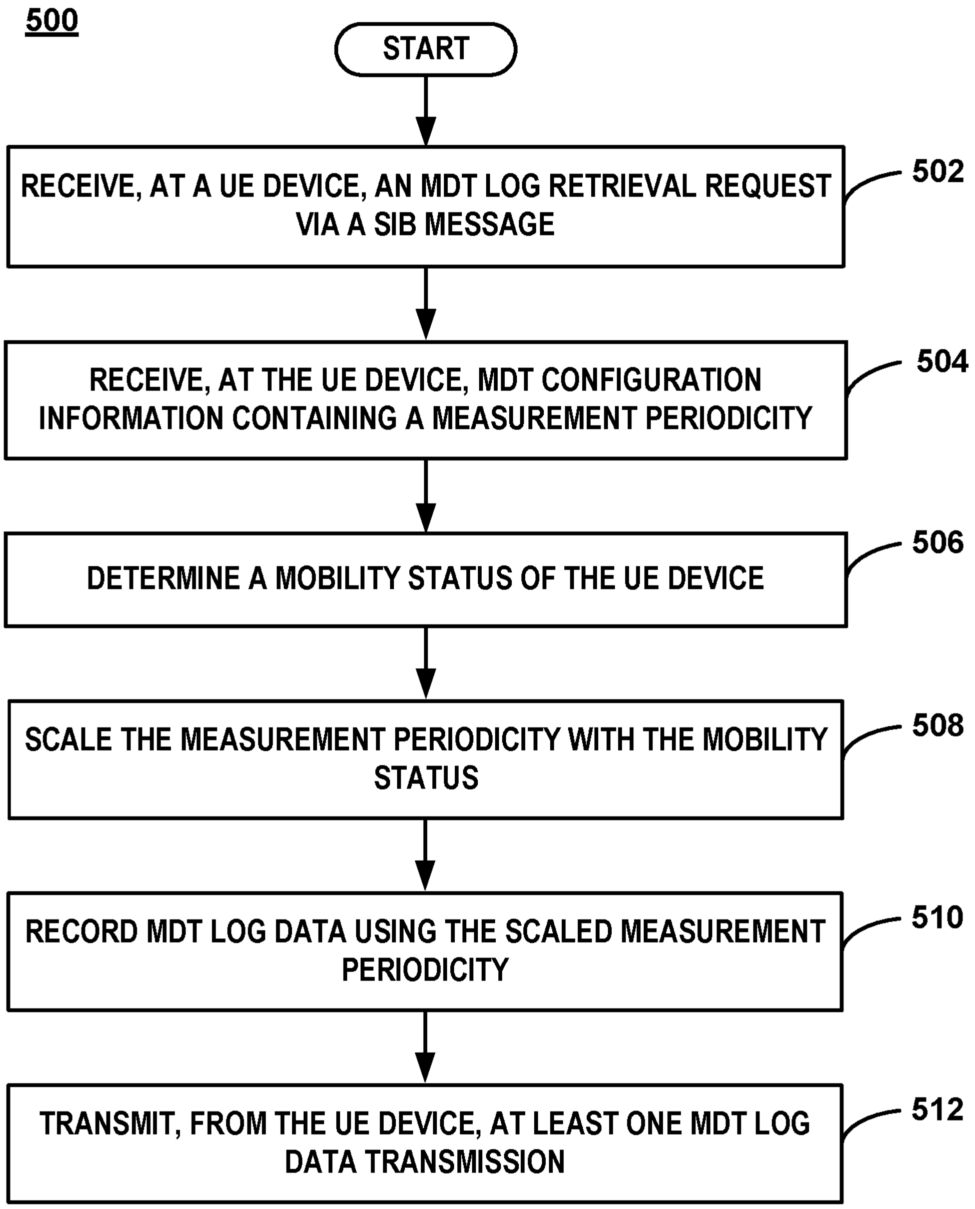
FIG. 5 is a flowchart of an example of a method in which the MDT log availability indication is omitted during retrieval of MDT log data from a UE device.

FIG. 5 is a flowchart of an example of a method in which the MDT log availability indication is omitted during retrieval of MDT log data from a UE device. The method 500 begins at step 502 with UE device 106 receiving an MDT log retrieval request via a SIB message. At step 504, UE device 106 receives, via antenna 212 and receiver 214, MDT configuration information containing a measurement periodicity (e.g., logging interval) while UE device 106 is in the CONNECTED mode. At step 506, UE device 106 has transitioned to an IDLE or INACTIVE mode whereby UE device 106 utilizes controller 216 to determine a mobility status of UE device 106. At step 508, UE device 106 utilizes controller 216 to scale the received measurement periodicity with the determined mobility status of UE device 106. At step 510, UE device 106 utilizes controller 216 to record MDT log data using the scaled measurement periodicity. In some examples, the scaled measurement periodicity is applied to the entire MDT log. At step 512, UE device 106 transmits at least one MDT log data transmission. In other examples, one or more of the steps of method 500 may be omitted, combined, performed in parallel, or performed in a different order than that described herein or shown in FIG. 5. In still further examples, additional steps may be added to method 500 that are not explicitly described in connection with the example shown in FIG. 5.

The scaling of the measurement periodicity shown and described in connection with the method of FIG. 5 can reduce the memory size required for MTC UE devices. For example, if an MTC UE device is stationary, the logging interval may be increased (e.g., the time between making MDT measurements is increased), which reduces the amount of memory required in the MTC UE device. Since the base station does not necessarily know the mobility status of a UE device, it is difficult for the base station to configure the correct measurement periodicity (e.g., logging interval). Thus, if the mobility status of an MTC UE device is determined to be "stationary," the logging interval for the "stationary" MTC UE device may be scaled (e.g., increased) by the "stationary" mobility status. Conversely, if the MTC UE device is moving quickly, the logging interval may be reduced. Thus, if the mobility status of a UE device is determined to be "rapidly moving," the logging interval for the "rapidly moving" UE device may be scaled (e.g., decreased) by the "rapidly moving" mobility status.

However, one of the guiding principles for logging and time stamping within the MDT logs is that the measurement periodicity stays constant throughout the MDT log. Thus, in some examples, the UE device only has to keep the time stamp of the initial MDT measurement and the time stamp of the final MDT measurement, and the network can figure out the time stamp for all of the MDT measurements between the initial MDT measurement and the final MDT measurement without time stamping. In keeping with the principle of maintaining a constant measurement periodicity throughout the MDT log, the UE device can apply the scaled measurement periodicity at the beginning of the MDT log and maintain the same scaled measurement periodicity throughout the entire MDT log.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:

determining a minimization of drive test (MDT) log is available;

transmitting, from a user equipment (UE) device via a first random access message, an MDT log availability indication, the first random access message being a random access preamble message configured for a pre-connection transmission to exchange data transmissions during a random access procedure, as specified in at least one release of 3$^{rd}$ Generation Partnership Project (3GPP);

receiving, at the UE device via a second random access message, an MDT log retrieval request using the pre-connection transmission; and transmitting, from the UE device, at least one MDT log data transmission.

2. The method of claim 1, wherein the MDT log retrieval request specifies a particular MDT campaign.

3. The method of claim 1, wherein the MDT log data is transmitted in at least one of the following: a Radio Resource Control (RRC) Early Data Request message, an RRC Resume Request message, and an RRC Setup Complete message.

4. The method of claim 1, wherein the second random access message is configured for the pre-connection transmission.

5. The method of claim 1, wherein the MDT log retrieval request is received in at least one of the following: a random access response message, a Radio Resource Control (RRC) Early Data Complete message, and an RRC Resume Complete message.

6. The method of claim 1, wherein the MDT log data is transmitted after the UE device transitions to a CONNECTED mode.

7. A method comprising:

receiving, at a user equipment (UE) device via a random access message, a minimization of drive test (MDT) log retrieval request;

transmitting, from the UE device via a random access preamble message, an MDT log availability indication, the random access preamble message configured for a pre-connection transmission to exchange data transmissions during a random access procedure, as specified in at least one release of 3$^{rd}$ Generation Partnership Project (3GPP);

receiving, at the UE device, MDT configuration information containing a measurement periodicity;

determining a mobility status of the UE device;

scaling the measurement periodicity with the mobility status;

recording MDT log data using the scaled measurement periodicity; and transmitting, from the UE device, at least one MDT log data transmission.

8. A user equipment (UE) device comprising:

a controller configured to determine that a minimization of drive test (MDT) log is available;

a transmitter configured to transmit, via a first random access message, an MDT log availability indication, the first random access message being a random access preamble message configured for a pre-connection transmission to exchange data transmissions during a random access procedure, as specified in at least one release of 3rd Generation Partnership Project (3GPP); and a receiver configured to receive, via a second random access message, an MDT log retrieval request using the pre-connection transmission;

the transmitter further configured to transmit at least one MDT log data transmission.

9. The UE device of claim 8, wherein the MDT log retrieval request specifies a particular MDT campaign.

10. The UE device of claim 8, wherein the transmitter is further configured to transmit the MDT log data in at least one of the following: a Radio Resource Control (RRC) Early Data Request message, an RRC Resume Request message, and an RRC Setup Complete message.

11. The UE device of claim 8, wherein the second random access message is configured for the pre-connection transmission.

12. The UE device of claim 8, wherein the receiver is further configured to receive the MDT log retrieval request in at least one of the following: a random access response message, a Radio Resource Control (RRC) Early Data Complete message, and an RRC Resume Complete message.

13. The UE device of claim 8, wherein the transmitter is further configured to transmit the MDT log data after the UE device transitions to a CONNECTED mode.

14. A user equipment (UE) device comprising:

a receiver configured to receive:

a minimization of drive test (MDT) log retrieval request via a random access message, and MDT configuration information containing a measurement periodicity;

a transmitter configured to transmit, via a random access preamble message, an MDT log availability indication, the random access preamble message configured for a pre-connection transmission to exchange data transmissions during a random access procedure, as specified in at least one release of 3rd Generation Partnership Project (3GPP); and a controller configured to:

determine a mobility status of the UE device, scale the measurement periodicity with the mobility status, and record MDT log data using the scaled measurement periodicity, the transmitter further configured to transmit at least one MDT log data transmission.

* * * * *